(12) United States Patent
Shibano et al.

(10) Patent No.: US 8,460,061 B2
(45) Date of Patent: Jun. 11, 2013

(54) METHOD FOR PRODUCING LARGE-SIZE SYNTHETIC QUARTZ GLASS SUBSTRATE

(75) Inventors: Yukio Shibano, Joetsu (JP); Atsushi Watabe, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 378 days.

(21) Appl. No.: 12/751,697

(22) Filed: Mar. 31, 2010

(65) Prior Publication Data
US 2010/0255761 A1    Oct. 7, 2010

(30) Foreign Application Priority Data

Apr. 1, 2009    (JP) ................................ 2009-089043

(51) Int. Cl.
    *B24B 1/00*    (2006.01)
(52) U.S. Cl.
    USPC ........ 451/41; 451/57; 451/58; 451/5; 451/66; 451/65
(58) Field of Classification Search
    USPC ............................ 451/41, 42, 57, 58, 66, 287
    See application file for complete search history.

(56) References Cited

U.S. PATENT DOCUMENTS

| | | | |
|---|---|---|---|
| 5,599,423 A | 2/1997 | Parker et al. | |
| 5,838,447 A | 11/1998 | Hiyama et al. | |
| 5,989,107 A * | 11/1999 | Shimizu et al. | 451/57 |
| 6,183,345 B1 | 2/2001 | Kamono et al. | |
| 6,343,978 B1 * | 2/2002 | Shimizu et al. | 451/57 |
| 6,595,831 B1 * | 7/2003 | Hirokawa et al. | 451/36 |
| 7,183,210 B2 * | 2/2007 | Shibano et al. | 438/689 |
| 7,191,618 B2 * | 3/2007 | Shibano et al. | 65/29.12 |
| 7,608,542 B2 * | 10/2009 | Ueda et al. | 438/689 |
| 8,029,335 B2 * | 10/2011 | Takahashi et al. | 451/11 |
| 8,123,593 B2 * | 2/2012 | Hoon | 451/8 |
| 8,162,724 B2 * | 4/2012 | Yamauchi et al. | 451/36 |
| 2001/0019934 A1 * | 9/2001 | Nishimura et al. | 451/8 |
| 2002/0197745 A1 | 12/2002 | Shanmugasundram et al. | |
| 2005/0019677 A1 | 1/2005 | Nakatsu et al. | |
| 2005/0202756 A1 | 9/2005 | Moore et al. | |
| 2007/0059608 A1 * | 3/2007 | Ikuta et al. | 430/5 |
| 2007/0132068 A1 | 6/2007 | Shibano et al. | |
| 2008/0261119 A1 * | 10/2008 | Ueda et al. | 430/5 |

FOREIGN PATENT DOCUMENTS

| | | |
|---|---|---|
| EP | 1 092 505 A2 | 4/2001 |
| EP | 1 281 476 A2 | 2/2003 |
| JP | 2003-292346 | 10/2003 |
| JP | 2007-1003 | 1/2007 |
| WO | 2004/075276 A | 9/2004 |
| WO | 2007/119860 A1 | 10/2007 |

OTHER PUBLICATIONS

European Search Report issued Jun. 30, 2010, in corresponding European Patent Application No. 10250688.8.

* cited by examiner

*Primary Examiner* — George Nguyen
(74) *Attorney, Agent, or Firm* — Birch, Stewart, Kolasch & Birch, LLP

(57) ABSTRACT

A large-size synthetic quartz glass substrate is produced by measuring a flatness and parallelism of front and back surfaces of a synthetic quartz glass substrate stock having a diagonal length of at least 1,000 mm, and partially removing raised portions and thick portions of the substrate stock on the basis of the measured data of flatness and parallelism. The removing step includes abrasive working by a first working tool having a diameter of 15-50% of the diagonal length, and abrasive working by a second working tool having a smaller diameter.

7 Claims, 3 Drawing Sheets

METHOD FOR PRODUCING LARGE-SIZE SYNTHETIC QUARTZ GLASS SUBSTRATE

CROSS-REFERENCE TO RELATED APPLICATION

This non-provisional application claims priority under 35 U.S.C. §119(a) on Patent Application No. 2009-089043 filed in Japan on Apr. 1, 2009, the entire contents of which are hereby incorporated by reference.

TECHNICAL FIELD

This invention relates to a method for producing large-size synthetic quartz glass substrates suited for use as array side and color filter side photomask substrates in TFT liquid crystal panels.

BACKGROUND ART

In general, large-size synthetic quartz glass substrates are manufactured by lapping a plate-shaped synthetic quartz stock with a slurry of loose abrasives such as alumina in water for abrading away raised and recessed portions (irregularities) and polishing with a slurry of abrasives such as cerium oxide in water.

Double and single-side lapping machines used in the lapping process are designed so as to force a substrate against a lapping plate and utilize a reaction force against the resultant elastic deformation for flatness correction. They have the drawback that as the substrate size becomes larger, the reaction force considerably decreases, leading to a reduction of the ability to remove moderate irregularities on the substrate surface.

The problem may be solved by measuring a flatness and parallelism of a large-size substrate and partially removing raised portions and thick portions of the substrate on the basis of the measured data, as disclosed in JP-A 2003-292346. Also a quartz glass substrate may be polished by immersing the substrate in a polishing fluid, adjusting the attitude of the substrate, and bubbling a gas into the polishing fluid, the gas bubbling step being based on data indicative of the relationship of flatness and flaws of the substrate to positions on its surface, as disclosed in JP-A 2007-001003. A quartz glass substrate with a high flatness is produced at a high processing stability. However, as the substrate size becomes larger, the working time is prolonged. There exists a need for an economical method capable of flatness correction within a short time.

CITATION LIST

Patent Document 1: JP-A 2003-292346
Patent Document 2: JP-A 2007-001003

SUMMARY OF INVENTION

An object of the invention is to provide a method for producing a large-size synthetic quartz glass substrate, which is capable of correcting flatness and parallelism within a short time.

The inventors have found that when a large-size synthetic quartz glass substrate is produced by measuring a flatness and parallelism of front and back surfaces of a substrate stock and partially removing raised portions and thick portions of the substrate stock on the basis of the measured data, the substrate can be corrected for flatness and parallelism within a short time by using two working tools of different size in the removing step. Although a conventional working tool having a small diameter, when used alone, often produces streaks on the substrate surface, the invention minimizes such surface streaks.

Accordingly, the invention provides a method for producing a large-size synthetic quartz glass substrate comprising the steps of measuring a flatness and parallelism of front and back surfaces of a large-size synthetic quartz glass substrate stock having a diagonal length of at least 1,000 mm while holding the substrate stock vertically, and partially removing raised portions and thick portions of the substrate stock on the basis of the measured data of flatness and parallelism to produce a large-size synthetic quartz glass substrate. The removing step includes abrasive working by a first working tool having a diameter corresponding to 15 to 50% of the substrate diagonal length, and abrasive working by a second working tool having a smaller diameter than the first working tool.

Preferably, the second working tool has a diameter corresponding to 10 to 40% of the diameter of the first working tool.

Typically, the large-size synthetic quartz glass substrate produced has a flatness/diagonal length of up to $8 \times 10^{-6}$.

ADVANTAGEOUS EFFECTS OF INVENTION

The method of the invention is effective in correcting for flatness and parallelism a large-size synthetic quartz glass substrate stock within a short time, and successful in producing a large-size synthetic quartz glass substrate with a high flatness and parallelism.

DESCRIPTION OF EMBODIMENTS

The method for producing a large-size synthetic quartz glass substrate according to the invention comprises the steps of measuring a flatness and parallelism of front and back surfaces of a large-size synthetic quartz glass substrate stock having a diagonal length of at least 1,000 mm while holding the substrate stock vertically, and partially removing raised portions and thick portions of the substrate stock on the basis of the measured data of flatness and parallelism to produce a large-size synthetic quartz glass substrate. The removing step includes abrasive working by a first working tool having a diameter corresponding to 15 to 50% of the substrate diagonal length, and abrasive working by a second working tool having a smaller diameter than the first working tool.

The method generally includes steps of:
(1) measuring a flatness and parallelism of front and back surfaces of a large-size synthetic quartz glass substrate stock,
(2) computing a material removal amount and a traverse rate of a first working tool,
(3) working by the first working tool based on the computed data of (2), (4) computing a substrate topography as worked by the first working tool, and computing a material removal amount and a traverse rate of a second working tool based on the computed topography data, and (5) working by the second working tool based on the computed data of (4).

Each step is described below.

(1) Measurement of Flatness and Parallelism of Front and Back Surfaces of a Large-Size Synthetic Quartz Glass Substrate Stock Step (1) is to measure a flatness and parallelism of front and back surfaces of a large-size synthetic quartz glass substrate stock which is tailored into a large-size synthetic quartz glass substrate, while the substrate stock is held vertically. Preferably the substrate stock is given a certain parallelism (thickness variation accuracy within substrate) by a double-side lapping machine. This is because a longer correction time may be necessary if the substrate stock has a poor parallelism. Measurement of flatness may be carried out using a flatness meter, for example, commercially available from Kuroda Precision Industries Ltd. while holding the substrate stock vertically in order to eliminate any deflection of the substrate stock by its own weight. Parallelism may be measured by a micrometer, for example, commercially available from Mitsutoyo Corp.

Figure 1:
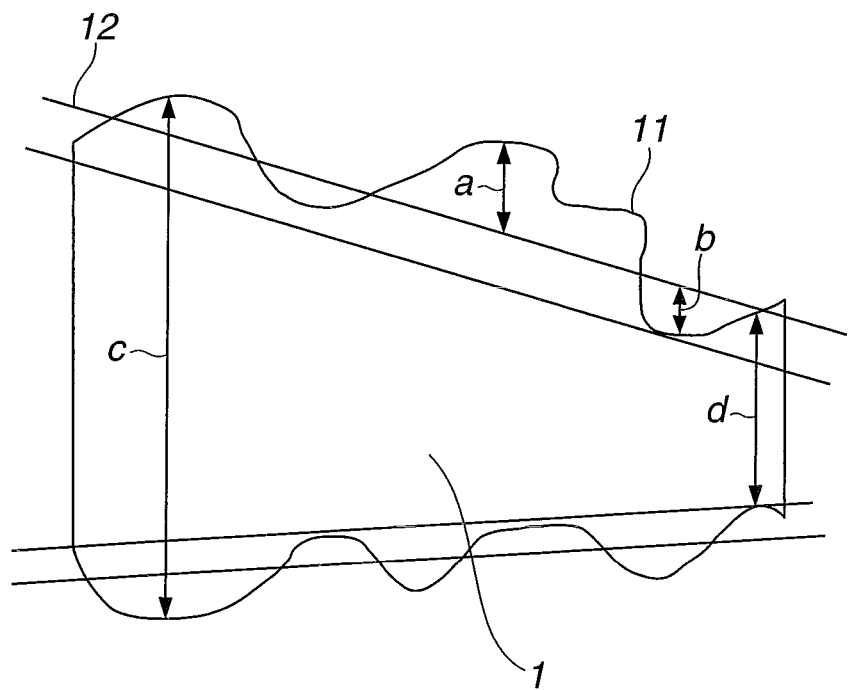
FIG. 1 is a schematic cross-sectional view of a substrate, illustrating flatness and parallelism.

FIG. 1 is a schematic cross-sectional view of a substrate 1 for illustrating flatness and parallelism. Provided that a least-square planes 12 computed from a substrate surface 11 is used as a reference plane, the flatness is the sum of a maximum "a" of the distance between the convex side of the substrate surface 11 and the reference surface 12 and a maximum "b" of the distance between the concave side of the substrate surface 11 and the reference surface 12. The parallelism is the difference between a maximum "c" and a minimum "d" of the distance between the front and back surfaces.

Figure 2:
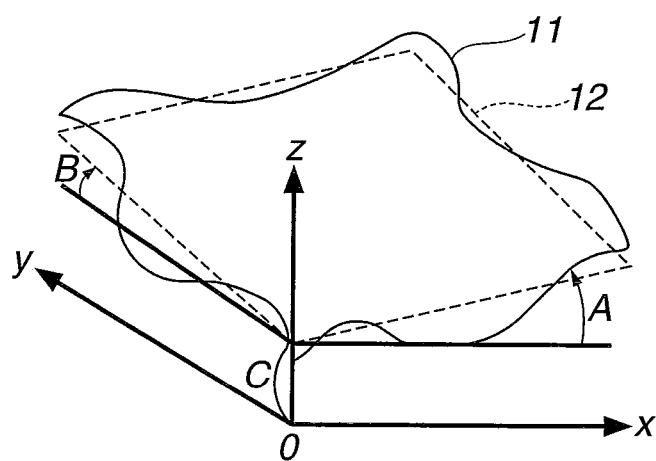
FIG. 2 schematically illustrates a least square plane.

FIG. 2 schematically illustrates how to compute a least square plane. Illustrated in FIG. 2 are a substrate surface 11 and a least-square planes 12.

A plane may be represented by the equation of z indicative of height:

$$z = ax + by + c$$

wherein a, b and c are arbitrary constants. Assume that "s" designates the difference between a measurement $zi(x_i, y_i)$ of a height at a certain measurement point $(x_i, y_i)$ on a flatness measurement data plane and a height $(ax_i + y_i + c)$ determined from the equation at the same position $(x_i, y_i)$. Then "s" is given by the equation:

$$s = \{z_i(x_i,y_i) - (ax_i + y_i + c)\}^2$$

Values of s are computed over the entire flatness measurement surface $(x_{0 \rightarrow n}, y_{0 \rightarrow n})$, and a, b, and c providing that their sum S becomes minimum are computed. Assume that a→A, b→B, and c→C. Then the equation of z indicative of height: z = Ax + By + C becomes the equation indicative of a least square plane.

Figure 3:
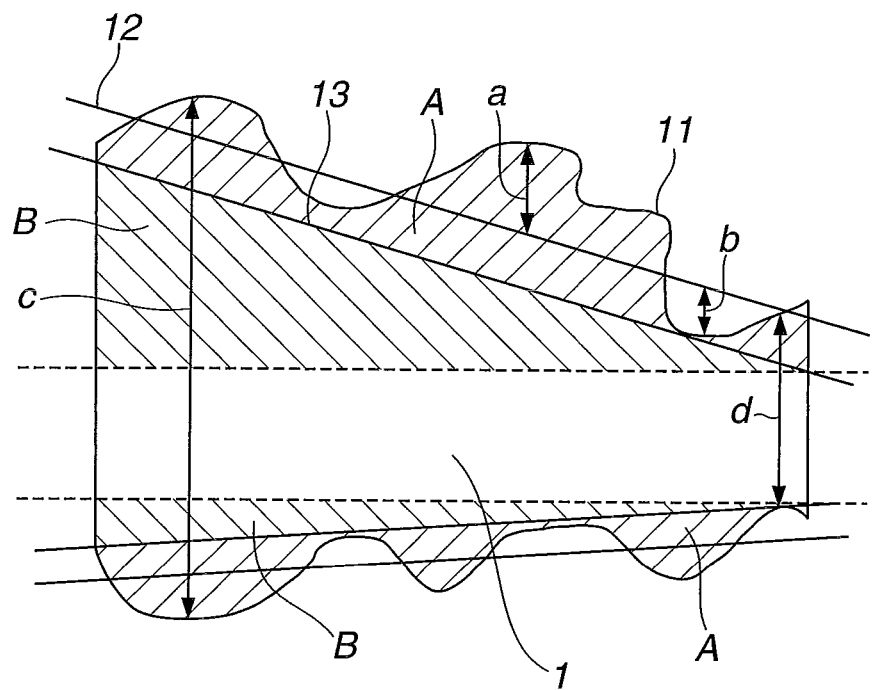
FIG. 3 schematically illustrates portions to be removed.

(2) Computing a Material Removal Amount and a Traverse Rate of a First Working Tool Illustrated in FIG. 3 are a substrate 1, a substrate surface 11, a least-square planes 12, and a surface 13 worked to be flat.

The measurement data obtained in (1) are stored in a computer by assigning a flatness at a certain point within the substrate as height data. Based on these data, a material removal amount (designated A in FIG. 3) necessary to abrade away the substrate surface to be flat is computed for each of the front and back surfaces. A surface 13 which is worked to be flat for each of the front and back surfaces is parallel to the least square plane for each of the front and back surfaces and extends contiguous to the most recessed point in the measured surface.

Next, after both the surfaces are worked flat, a parallelism of the substrate is computed. From the computed parallelism, a material removal amount (designated B in FIG. 3) is computed. The material removal amount is determined so as to equalize the thickness to the thinnest portion of the flattened substrate. FIG. 3 is a schematic exaggerated illustration of material removal portions so that removal portions A and B are readily understood. In this way, a material removal amount (I) at an ideal surface and point is determined from the measured flatness and parallelism of the front and back surfaces of the large-size synthetic quartz glass substrate stock.

A large-size synthetic quartz glass substrate stock having substantially the same size, flatness and parallelism of front and back surfaces is worked by a first working tool, while the traverse rate, rotation, and material of the working tool are changed. In this way, the material removal amount is previously computed, from which a working profile is obtained on the basis of the material removal amount (I) at an ideal surface and point. Based on this, a material removal amount (II) at each surface and point by the first working tool and a traverse rate are computed.

(3) Working by the First Working Tool Based on the Computed Data of (2)

The substrate stock is abrasive worked by the first working tool based on the material removal amount (II) and traverse rate of (2). The first working tool has a diameter corresponding to 15 to 50%, preferably 30 to 45% of the diagonal length of the substrate stock. If the diameter of the first working tool is less than 15% of the substrate diagonal length, the working time is not fully reduced. If the diameter is more than 50% of the substrate diagonal length, flatness correction becomes less, which is uneconomical because the subsequent working time of a second working tool is prolonged. Specifically, the first working tool preferably has a diameter of 250 to 800 mm, more preferably 400 to 600 mm. The first working tool preferably has a circular shape when operations such as attachment of abrasive cloth are considered.

Figure 4:
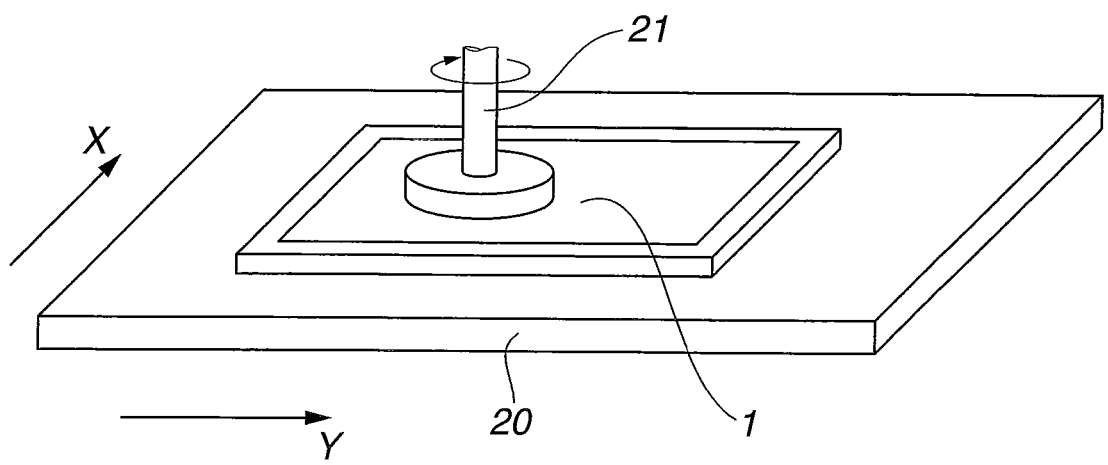
FIG. 4 is a perspective view of a working apparatus.

FIG. 4 is a schematic perspective view of a working apparatus. In FIG. 4, a substrate 1 is held on a platform 20, and a working tool 21 is movable over the substrate 1 in X and Y directions. The movement of the working tool 21 can be computer controlled. Using a working apparatus as shown in FIG. 4, abrasive working is carried out while controlling the residence time of the working tool such that in an area requiring a large removal amount, the traverse rate of the working tool 21 is slowed to extend the residence time, and inversely in an area requiring a small removal amount, the traverse rate of the working tool 21 is increased to shorten the residence time.

The substrate-holding platform 20 is preferably made of expanded polyurethane having a Shore A hardness of up to 80, more preferably 15 to 70, and a compressibility of 5 to 80%, more preferably 10 to 50%. A platform with a Shore A hardness of more than 80 may cause flaws to the substrate. With a compressibility of less than 5%, the entire surface of the substrate may not be in close contact with the platform, and contact pressure may be locally increased to form defects at such sites.

The working tool 21 is coupled to a rotating mechanism. The rotation count of the working tool 21 is preferably adjusted so that the abrasive slurry may not be splashed out of the apparatus, and specifically to 30 to 300 rpm, more preferably 30 to 120 rpm, although it may vary with the tool size. The working tool 21 is connected to the rotating shaft via a universal joint such that the tool may follow a slope of the substrate surface. Attached to the working tool 21 is an abrasive cloth which is typically polyurethane foam or nonwoven pad.

Abrasive grains used herein are not particularly limited. Cerium oxide or colloidal silica grains are preferred as common abrasives. Abrasive grains preferably have an average particle size of 0.02 to 3 µm, more preferably 0.05 µm to 1 µm. Working is carried out while discharging the abrasive slurry from within the tool or immersing the substrate in the abrasive slurry. The preferred slurry contains 10 to 50% by weight, more preferably 10 to 40% by weight, further preferably 10 to 25% by weight of abrasive grains. Preferably the tool is oscillated while rotating so as to facilitate entry of the slurry to the site being worked. In this case, a working profile is previously examined under such conditions, based on which a traverse rate is computed.

Figure 5:
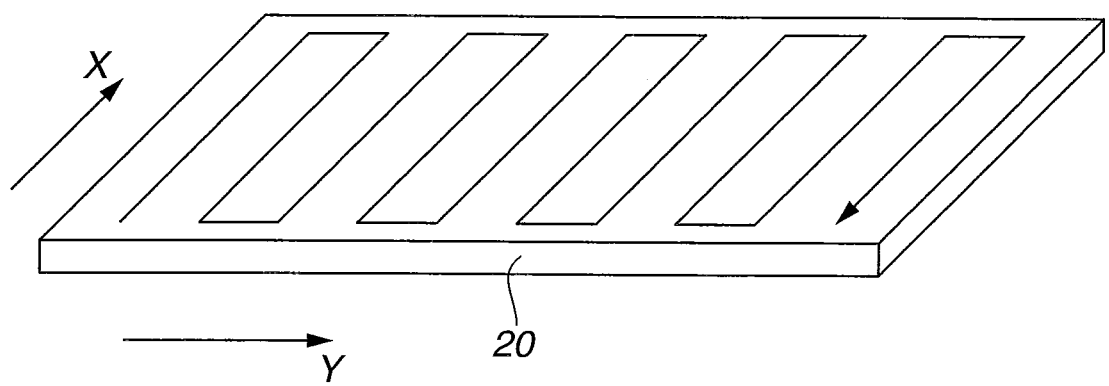
FIG. 5 is a perspective view illustrating the traverse mode of a working tool.

FIG. 5 is a perspective view showing how to traverse the working tool 21 across the substrate on the platform 20. Abrasive working may be carried out by traversing the working tool continuously parallel to X axis direction at a predetermined rate, then moving it over a certain pitch in Y axis direction, and so on as shown in FIG. 5. The feed pitch in Y axis direction is preferably up to 30%, more preferably 10 to 25% of the diameter of the first working tool. If the pitch is more than 30% of the diameter, flatness correction may become less, which is uneconomical because the subsequent working time of a second working tool is prolonged.

(4) Computing a Substrate Topography as Worked by the First Working Tool, and Computing a Material Removal Amount and a Traverse Rate of a Second Working Tool Based on the Computed Topography Data Abrasive working is carried out while the first working tool traverses across the surface of a large-size synthetic quartz glass substrate stock. The entire surface of the large-size synthetic quartz glass substrate stock cannot be worked at a time. Therefore, when only the first working tool is used, a difference may occur in some areas between an actual material removal amount and the material removal amount (I) at each ideal surface and point as computed from the measured flatness and parallelism of the front and back surfaces of the substrate stock. To obviate the difference, a second working tool may be used to abrade away the area which has not been fully abraded by the first working tool, for example, four corners of the substrate. Specifically, from the data of flatness and parallelism prior to working by the second working tool, which are previously determined by calculation based on the result of the working profile using the first working tool, a necessary material removal amount to be removed by the second working tool and traverse rate are computed so as to meet the material removal amount (I). As in the case of the first working tool, a working profile achievable by the second working tool is previously examined, and further adjustment may be made based on that profile. In this way, the invention carries out efficient working since accuracy measurement is not made after working by the first working tool.

While the diameter, diameter/substrate diagonal length, traverse rate, and rotation count of the first working tool are previously involved in the computation, a necessary material removal amount to be removed by the second working tool and a traverse rate may be computed.

(5) Working by the Second Working Tool Based on the Computed Data of (4).

The substrate is worked by the second working tool in accordance with the necessary material removal amount and traverse rate computed in (4). The size of the second working tool should be smaller than that of the first working tool. Specifically the second working tool preferably has a diameter corresponding to 10 to 40%, more preferably 15 to 30% of the diameter of the first working tool. If the diameter of the second working tool is less than 10% of the first working tool diameter, the flatness correcting effect may become greater, but a longer working time may be necessary, which is uneconomical. If the diameter of the second working tool is more than 40% of the first working tool diameter, the material removal amount may not be precisely controlled and the flatness correcting effect may become lessened. Specifically the second working tool preferably has a diameter of 25 mm to 320 mm, more preferably 100 mm to 200 mm. Like the first working tool, the second working tool preferably has a circular shape. The working process may be the same as the first working tool. Combination of the first working tool with the second working tool may prevent streaks from forming on the substrate. Further polishing step may follow. Without polishing step, however, the method is successful in producing a large-size synthetic quartz glass substrate having satisfactory flatness and parallelism.

According to the invention, a large-size synthetic quartz glass substrate stock having a diagonal length of at least 1,000 mm is abrasively worked by the first working tool having a diameter of 15 to 50% of the substrate diagonal length, then further abrasively worked by the second working tool having a smaller diameter than the first working tool. More than one working step may be repeated for each of the first and second working tools.

With the method of the invention, a large-size synthetic quartz glass substrate stock may be corrected for flatness and parallelism within a short time, producing a large-size synthetic quartz glass substrate having a high flatness and parallelism. The large-size synthetic quartz glass substrate has a diagonal length of at least 1,000 mm, preferably 1,500 mm to 2,500 mm. The shape of a large-size substrate may be square, rectangular, circular or otherwise. In the case of circular substrates, the diagonal length refers to the diameter. The thickness of a large-size substrate is not particularly limited, although it is preferably 5 mm to 50 mm, more preferably 10 mm to 20 mm.

Preferably the large-size synthetic quartz glass substrate produced is highly flat as demonstrated by a flatness/diagonal length of up to $8 \times 10^{-6}$, more preferably up to $6 \times 10^{-6}$, and even more preferably up to $5 \times 10^{-6}$. The flatness/diagonal length is typically at least $1 \times 10^{-6}$, thought not limited thereto.

Also preferably the large-size synthetic quartz glass substrate produced has a parallelism of up to 50 µm, more preferably up to 30 µm, and even more preferably up to 10 µm. If the parallelism is more than 50 µm, a more burden may be imposed on correction operation for minimizing a variation of exposure gap when the substrate is mounted in the exposure tool.

With the method of the invention, a large-size synthetic quartz glass substrate stock may be corrected for flatness and parallelism within a short time, and a large-size synthetic quartz glass substrate having a high flatness and parallelism may be produced. A large-size photomask may be prepared using the large-size synthetic quartz glass substrate. The large-size photomask may be used in panel exposure to achieve an improvement in CD accuracy and enable exposure of a fine feature pattern. This may eventually lead to improvements in the manufacture yield of panels.

EXAMPLE

Examples and Comparative Examples are given below although the invention is not limited thereto.

Example 1

A synthetic quartz glass substrate stock was prepared by lapping a synthetic quartz glass substrate stock having a size of 850 mm×1200 mm×10.2 mm (thick) on a planetary motion double-side lapping machine using abrasives FO #1000 (Fujimi Abrasive Co., Ltd.). The substrate stock had a parallelism of 13 µm and a flatness of 50 µm. The flatness was measured by a flatness tester by Kuroda Precision Industries Ltd., and the parallelism was measured by a micrometer by Mitsutoyo Corp. From the measured data, a material removal amount at each relevant surface and point were determined.

Figure 6:
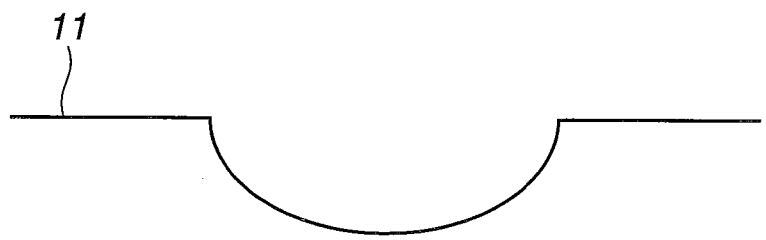
FIG. 6 illustrates a working profile in Example 1.

Then the substrate stock was mounted on a platform 20 in the apparatus shown in FIG. 4. The platform 20 used was a waxless holding pad BP-102 of expanded polyurethane having Shore A hardness 66 and compressibility 25% (Fujibo Ehime Co., Ltd.). The first working tool was a stainless steel SUS304 disk having a diameter of 500 mm to which an abrasive cloth of polyurethane was attached. A slurry was prepared by suspending cerium oxide grains with an average particle size of 1 µm in water in a concentration of 20 wt %. In a previous test, a working profile was determined by providing a large-size synthetic quartz glass substrate stock having substantially the same size, flatness and parallelism on front and back surfaces and working it by the first working tool. The test revealed a working profile having a larger removal amount at the center and a smaller removal amount at the periphery of the tool as shown in FIG. 6. Based on this result plus the feed pitch in Y axis direction, a traverse rate of the first working tool was computed. Abrasive working was effected based on the traverse rate by traversing the first working tool continuously parallel to X axis and feeding in Y axis direction a pitch (100 mm) corresponding to 20% of the diameter of the first working tool. The first working tool was rotated at 60 rpm.

The second working tool was a stainless steel SUS304 disk having a diameter of 150 mm to which an abrasive cloth of polyurethane was attached. A slurry was prepared by suspending cerium oxide grains with an average particle size of 1 µm in water in a concentration of 20 wt %. On the basis of the data of flatness and parallelism prior to working by the second working tool, which was previously computed based on the foregoing working profile, a necessary material removal amount to be removed by the second working tool was computed and a traverse rate of the second working tool was determined. The feed pitch in Y axis direction was 20% of the diameter of the second working tool, i.e., 30 mm. The second working tool was rotated at 150 rpm. The traverse rate of the second working tool in X axis direction was 30 mm/min at minimum. A traverse rate of the second working tool on a distinct area of the substrate was computed from a removal rate of that area. The front surface of the substrate was processed in this way, after which the back surface was similarly processed. The results are shown in Table 1.

The working time was 26, provided that the working time passed when working was effected by the second working tool alone was 100. That is, working was completed within a time of about ¼. The substrate thus worked had a flatness of 7.8 µm and a parallelism of 7.6 µm. Although the surface of a substrate which was worked by the second working tool alone bore streaks, the surface of the substrate worked in Example 1 displayed no streaks.

Examples 2 to 6 and Comparative Example 1

Substrates were worked as in Example 1 aside from using the first and second working tools of different size. The working time was reported, provided that the working time passed when working was effected by a single working tool having a diameter of 100 mm was 100.

TABLE 1

| | Substrate size, mm <diagonal length, mm> | Prior to working | | 1st working tool diameter, mm (diameter/ diagonal length) | 2nd working tool diameter, mm (diameter/ 1st tool diameter) | Working Time, % | After working | | |
|---|---|---|---|---|---|---|---|---|---|
| | | Flatness, µm | Parallelism, µm | | | | Flatness, µm | Parallelism, µm | Flatness/ Diagonal length, ×10$^{-6}$ |
| Example 1 | 850 × 1200 × 10.2 <1471> | 50 | 13 | 500 (34%) | 150 (30%) | 26 | 7.8 | 7.6 | 5.3 |
| Example 2 | 1220 × 1400 × 13.2 <1857> | 66 | 30 | 500 (26%) | 150 (30%) | 29 | 8.6 | 9.1 | 4.6 |
| Example 3 | 850 × 1200 × 10.2 <1471> | 44 | 15 | 600 (41%) | 100 (17%) | 24 | 8.7 | 8.2 | 5.9 |
| Example 4 | 1700 × 1800 × 17.2 <2476> | 71 | 28 | 800 (32%) | 150 (19%) | 26 | 8.7 | 9.1 | 3.5 |
| Example 5 | 850 × 1200 × 10.2 <1471> | 47 | 15 | 270 (18%) | 100 (37%) | 64 | 8.3 | 8.8 | 5.6 |
| Example 6 | 850 × 1200 × 10.2 <1471> | 48 | 14 | 700 (48%) | 100 (12%) | 80 | 9.2 | 9.1 | 6.3 |
| Comparative Example 1 | 850 × 1200 × 10.2 <1471> | 45 | 10 | 500 (34%) | | 23 | 22.4 | 23.1 | 15 |

Japanese Patent Application No. 2009-089043 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for producing a large-size synthetic quartz glass substrate comprising the steps of:
measuring a flatness and parallelism of front and back surfaces of a large-size synthetic quartz glass substrate stock having a diagonal length of at least 1,000 mm while holding the substrate stock vertically; and
partially removing raised portions and thick portions of the substrate stock on the basis of the measured data of flatness and parallelism to produce a large-size synthetic quartz glass substrate, said removing step including abrasive working by a first working tool having a diameter corresponding to 15 to 50% of the substrate diagonal length, and abrasive working by a second working tool having a smaller diameter than the first working tool, said abrasive working by the first working tool and said abrasive working by the second working tool being conducted on the same substrate-holding platform.

2. The method of claim 1, the second working tool has a diameter corresponding to 10 to 40% of the diameter of the first working tool.

3. The method of claim 1, wherein the large-size synthetic quartz glass substrate has a flatness/diagonal length of up to $8 \times 10^{-6}$.

4. The method of claim 1, wherein the substrate-holding platform is made of expanded polyurethane having a Shore A hardness of up to 80 and a compressibility of 5 to 80%.

5. The method of claim 4, wherein the working tool is coupled to a rotating mechanism so that the rotation count of the working tool is 30 to 300 rpm, and an abrasive cloth in the form of polyurethane foam or nonwoven pad is attached to the working tool.

6. A method for producing a large-size synthetic quartz glass substrate comprising the steps of:
(1) measuring a flatness and parallelism of front and back surfaces of a large-size synthetic quartz glass substrate stock having a diagonal length of at least 1,000 mm while holding the substrate stock vertically,
(2) computing a material removal amount and a traverse rate of a first working toot, the first working tool having a diameter corresponding to 15 to 50% of the substrate diagonal length,
(3) abrasive working by the first working tool based on the computed data obtained in step (2),
(4) computing a substrate topography as worked by the first working tool, and computing a material removal amount and a traverse rate of a second working tool based on the computed topography data, wherein the second working tool has a smaller diameter than the first working tool, and
(5) abrasive working by the second working tool based on the computed data obtained in step (4), so as to partially remove raised portions and thick portions of the substrate stock on the basis of the measured data of flatness and parallelism to produce a large-size synthetic quartz glass substrate,
wherein the abrasive working by the first working tool and the abrasive working by the second working tool are conducted on the same substrate-holding platform.

7. The method of claim 6, wherein
in said step (1), the flatness and parallelism of front and back surfaces of the large-size synthetic quartz glass substrate stock are measured, while the substrate stock is held vertically,
in said step (2), the measurement data obtained in step (1) are stored in a computer by assigning a flatness at a certain point within the substrate as height data, and based on these data, a material removal amount A necessary to abrade away the substrate surface to be flat is computed for each of the front and back surfaces;
a parallelism of the substrate to be obtained after both the surfaces are worked flat is computed, and based on the computed parallelism, a material removal amount B is computed;
a material removal amount (I) at an ideal surface and point is determined from the measured flatness and parallelism of the front and back surfaces of the large-size synthetic quartz glass substrate stock; and
a large-size synthetic quartz glass substrate stock having substantially the same size, flatness and parallelism of front and back surfaces is worked by a first working tool, while the traverse rate, rotation, and material of the working tool are changed, whereby the material removal amount is previously computed, from which a working profile is obtained on the basis of the material removal amount (I) at an ideal surface and point, and based on this, a material removal amount (II) at each surface and point by the first working tool and a traverse rate are computed,
in said step (3), the substrate stock is abrasive worked by the first working tool based on the material removal amount (II) and traverse rate of (2),
in said step (4), based on the data of flatness and parallelism prior to working by the second working tool, which are previously determined by calculation based on the result of the working profile using the first working tool, a necessary material removal amount to be removed by the second working tool and traverse rate are computed so as to meet the material removal amount (I), and
in said step (5), the substrate is worked by the second working tool in accordance with the necessary material removal amount and traverse rate computed in step (4).

* * * * *